US012561272B2

(12) United States Patent
Healy et al.

(10) Patent No.: US 12,561,272 B2
(45) **Date of Patent: \*Feb. 24, 2026**

(54) BATTERY CLUSTER CONTROL

(71) Applicant: Cypress Semiconductor Corporation, San Jose, CA (US)

(72) Inventors: Mark Healy, Cork (IE); John Kizziar, Spokane, WA (US); Paul Walsh, Cork (IE)

(73) Assignee: Infineon Technologies Americas Corp., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/630,864

(22) Filed: Apr. 9, 2024

(65) Prior Publication Data

US 2025/0077464 A1 Mar. 6, 2025

Related U.S. Application Data

(60) Provisional application No. 63/536,326, filed on Sep. 1, 2023.

(51) Int. Cl.
*G06F 13/42* (2006.01)
*G06F 1/26* (2006.01)
(52) U.S. Cl.
CPC .......... *G06F 13/4282* (2013.01); *G06F 1/263* (2013.01); *G06F 2213/0002* (2013.01)
(58) Field of Classification Search
CPC .............................. G06F 13/4282; G06F 1/263
See application file for complete search history.

(56) References Cited

U.S. PATENT DOCUMENTS

| | | | | |
|---|---|---|---|---|
| 8,392,631 | B1 * | 3/2013 | Mora | H04L 69/18 |
| | | | | 710/33 |
| 11,245,437 | B2 * | 2/2022 | Mazumder | H04B 3/542 |
| 2017/0346419 | A1 | 11/2017 | Bogus et al. | |
| 2021/0075227 | A1 | 3/2021 | Chang et al. | |
| 2023/0170711 | A1 * | 6/2023 | Wang | H02J 7/34 |
| | | | | 320/118 |

FOREIGN PATENT DOCUMENTS

| | | |
|---|---|---|
| WO | 2018145150 A1 | 8/2018 |
| WO | 2021094011 A1 | 5/2021 |
| WO | 2022094925 A1 | 5/2022 |

OTHER PUBLICATIONS

EP Search Report from Application 24197487.2 dated Jan. 27, 2025; 7 pages.
EP Search Report from Application 24197485.6 dated Jan. 27, 2025; 10 pages.

* cited by examiner

*Primary Examiner* — Tim T Vo

(57) ABSTRACT

According to some embodiments, a battery cluster controller includes a serial interface configured to receive waveform data and a rank over a serial communication bus, a processor configured to generate a switching parameter based on the rank and the waveform data, and a modulation unit configured with the switching parameter to generate a bridge configuration signal to control a bridge for selectively connecting a battery element to an output terminal to generate a first component of a waveform.

18 Claims, 6 Drawing Sheets

300

400

| Rank | H-bridge Switch Position for each ranked cluster (402) | | | | Voltage (V) at H-bridge Switch Position (404) | | | | Time (us) at H-bridge Switch Position (406) | | | | Counter Value at H-bridge Switch Position (408) | | | |
|---|---|---|---|---|---|---|---|---|---|---|---|---|---|---|---|---|
| | Ph1 | Ph2 | Ph3 | Ph4 | Ph1 | Ph2 | Ph3 | Ph4 | Ph1 | Ph2 | Ph3 | Ph4 | Ph1 | Ph2 | Ph3 | Ph4 |
| 1 | 1 | 32 | 33 | 64 | 30 | 0 | -30 | 0 | 10.0 | 500.0 | 510.0 | 1000.0 | 2 | 100 | 102 | 200 |
| 2 | 2 | 31 | 34 | 63 | 60 | 30 | -60 | -30 | 19.9 | 490.0 | 519.9 | 990.0 | 4 | 98 | 104 | 198 |
| 3 | 3 | 30 | 35 | 62 | 90 | 60 | -90 | -60 | 30.0 | 480.1 | 530.0 | 980.1 | 6 | 96 | 106 | 196 |
| 4 | 4 | 29 | 36 | 61 | 120 | 90 | -120 | -90 | 40.2 | 470.0 | 540.2 | 970.0 | 8 | 94 | 108 | 194 |
| 5 | 5 | 28 | 37 | 60 | 150 | 120 | -150 | -120 | 50.6 | 459.8 | 550.6 | 959.8 | 10 | 92 | 110 | 192 |
| 6 | 6 | 27 | 38 | 59 | 180 | 150 | -180 | -150 | 61.2 | 449.4 | 561.2 | 949.4 | 12 | 90 | 112 | 190 |
| 7 | 7 | 26 | 39 | 58 | 210 | 180 | -210 | -180 | 72.1 | 438.8 | 572.1 | 938.8 | 14 | 88 | 114 | 188 |
| 8 | 8 | 25 | 40 | 57 | 240 | 210 | -240 | -210 | 83.3 | 427.9 | 583.3 | 927.9 | 17 | 86 | 117 | 186 |
| 9 | 9 | 24 | 41 | 56 | 270 | 240 | -270 | -240 | 95.1 | 416.7 | 595.1 | 916.7 | 19 | 83 | 119 | 183 |
| 10 | 10 | 23 | 42 | 55 | 300 | 270 | -300 | -270 | 107.5 | 404.9 | 607.5 | 904.9 | 21 | 81 | 121 | 181 |
| 11 | 11 | 22 | 43 | 54 | 330 | 300 | -330 | -300 | 120.6 | 392.5 | 620.6 | 892.5 | 24 | 79 | 124 | 179 |
| 12 | 12 | 21 | 44 | 53 | 360 | 330 | -360 | -330 | 135.0 | 379.4 | 635.0 | 879.4 | 27 | 76 | 127 | 176 |
| 13 | 13 | 20 | 45 | 52 | 390 | 360 | -390 | -360 | 150.9 | 365.0 | 650.9 | 865.0 | 30 | 73 | 130 | 173 |
| 14 | 14 | 19 | 46 | 51 | 420 | 390 | -420 | -390 | 169.6 | 349.1 | 669.6 | 849.1 | 34 | 70 | 134 | 170 |
| 15 | 15 | 18 | 47 | 50 | 450 | 420 | -450 | -420 | 193.4 | 330.4 | 693.4 | 830.4 | 39 | 66 | 139 | 166 |
| 16 | 16 | 17 | 48 | 49 | 480 | 450 | -480 | -450 | 250.0 | 306.6 | 750.0 | 806.6 | 50 | 61 | 150 | 161 |

Fig. 4

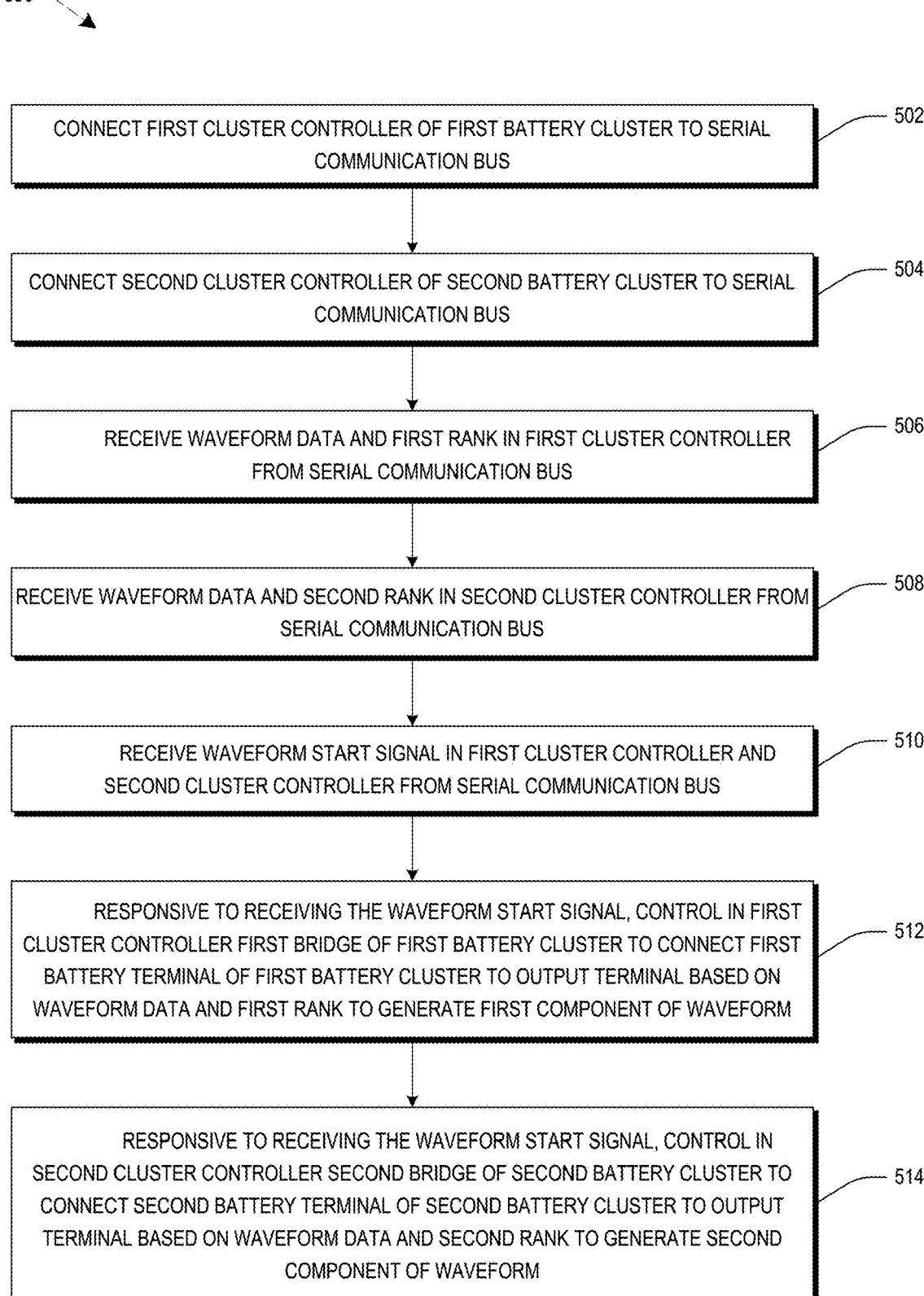

500

CONNECT FIRST CLUSTER CONTROLLER OF FIRST BATTERY CLUSTER TO SERIAL COMMUNICATION BUS — 502

CONNECT SECOND CLUSTER CONTROLLER OF SECOND BATTERY CLUSTER TO SERIAL COMMUNICATION BUS — 504

RECEIVE WAVEFORM DATA AND FIRST RANK IN FIRST CLUSTER CONTROLLER FROM SERIAL COMMUNICATION BUS — 506

RECEIVE WAVEFORM DATA AND SECOND RANK IN SECOND CLUSTER CONTROLLER FROM SERIAL COMMUNICATION BUS — 508

RECEIVE WAVEFORM START SIGNAL IN FIRST CLUSTER CONTROLLER AND SECOND CLUSTER CONTROLLER FROM SERIAL COMMUNICATION BUS — 510

RESPONSIVE TO RECEIVING THE WAVEFORM START SIGNAL, CONTROL IN FIRST CLUSTER CONTROLLER FIRST BRIDGE OF FIRST BATTERY CLUSTER TO CONNECT FIRST BATTERY TERMINAL OF FIRST BATTERY CLUSTER TO OUTPUT TERMINAL BASED ON WAVEFORM DATA AND FIRST RANK TO GENERATE FIRST COMPONENT OF WAVEFORM — 512

RESPONSIVE TO RECEIVING THE WAVEFORM START SIGNAL, CONTROL IN SECOND CLUSTER CONTROLLER SECOND BRIDGE OF SECOND BATTERY CLUSTER TO CONNECT SECOND BATTERY TERMINAL OF SECOND BATTERY CLUSTER TO OUTPUT TERMINAL BASED ON WAVEFORM DATA AND SECOND RANK TO GENERATE SECOND COMPONENT OF WAVEFORM — 514

Fig. 5

BATTERY CLUSTER CONTROL

RELATED APPLICATION(S)

This application claims priority to U.S. Provisional 63/536,326 filed on Sep. 1, 2023, the entirety of which is hereby incorporated by reference herein.

BACKGROUND

Battery powered systems, such as electric vehicles, use a direct current (DC) battery module for storing power. Some loads in the system may require an alternating current (AC) power supply. Inverters and voltage regulators may be provided to convert the voltage level of a power supply or to convert from a DC supply to an AC supply or from an AC supply to a DC supply.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a method comprises connecting a first cluster controller of a first battery cluster to a serial communication bus, connecting a second cluster controller of a second battery cluster to the serial communication bus, receiving waveform data and a first rank in the first cluster controller from the serial communication bus, receiving the waveform data and a second rank in the second cluster controller from the serial communication bus, receiving a waveform start signal in the first cluster controller and the second cluster controller from the serial communication bus, and responsive to receiving the waveform start signal, controlling, in the first cluster controller, a first bridge of the first battery cluster to connect a first battery terminal of the first battery cluster to an output terminal based on the waveform data and the first rank to generate a first component of a waveform, and controlling, in the second cluster controller, a second bridge of the second battery cluster to connect a second battery terminal of the second battery cluster to the output terminal based on the waveform data and the second rank to generate a second component of the waveform.

According to some embodiments, a battery cluster controller comprises a serial interface configured to receive waveform data and a rank over a serial communication bus, a processor configured to generate a switching parameter based on the rank and the waveform data, and a modulation unit configured with the switching parameter to generate a bridge configuration signal to control a bridge for selectively connecting a battery element to an output terminal to generate a first component of a waveform.

According to some embodiments, a system comprises an output terminal, a serial communication bus, a first battery cluster comprising a first battery element, a first bridge configured to selectively connect the first battery element to the output terminal based on a state of the first bridge, and a first cluster controller connected to first bridge and the serial communication bus and configured to receive waveform data and a first rank from the serial communication bus, receive a waveform start signal from the serial communication bus, and control the first bridge to connect the first battery element to the output terminal based on the waveform data and the first rank to generate a first component of a waveform, and a second battery cluster comprising a second battery element, a second bridge configured to selectively connect the second battery element to the output terminal based on a state of the second bridge, and a second cluster controller connected to the second bridge and the serial communication bus and configured to receive the waveform data and a second rank from the serial communication bus, receive the waveform start signal from the serial communication bus, and control the second bridge to connect the second battery element to the output terminal based on the waveform data and the second rank to generate a second component of the waveform.

According to some embodiments, a system comprises means for connecting a first cluster controller of a first battery cluster to a serial communication bus, means for connecting a second cluster controller of a second battery cluster to the serial communication bus, means for receiving waveform data and a first rank in the first cluster controller from the serial communication bus, means for receiving the waveform data and a second rank in the second cluster controller from the serial communication bus, means for receiving a waveform start signal in the first cluster controller and the second cluster controller from the serial communication bus, and responsive to receiving the waveform start signal, means for controlling, in the first cluster controller, a first bridge of the first battery cluster to connect a first battery terminal of the first battery cluster to an output terminal based on the waveform data and the first rank to generate a first component of a waveform, and means for controlling, in the second cluster controller, a second bridge of the second battery cluster to connect a second battery terminal of the second battery cluster to the output terminal based on the waveform data and the second rank to generate a second component of the waveform.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 4 is a diagram illustrating switching behavior for the battery clusters as a function of rank to generate the output waveform, in accordance with some embodiments.

FIG. 5 is a flow diagram of a method for generating a waveform in a battery system, in accordance with some embodiments.

DETAILED DESCRIPTION

Figure 1:
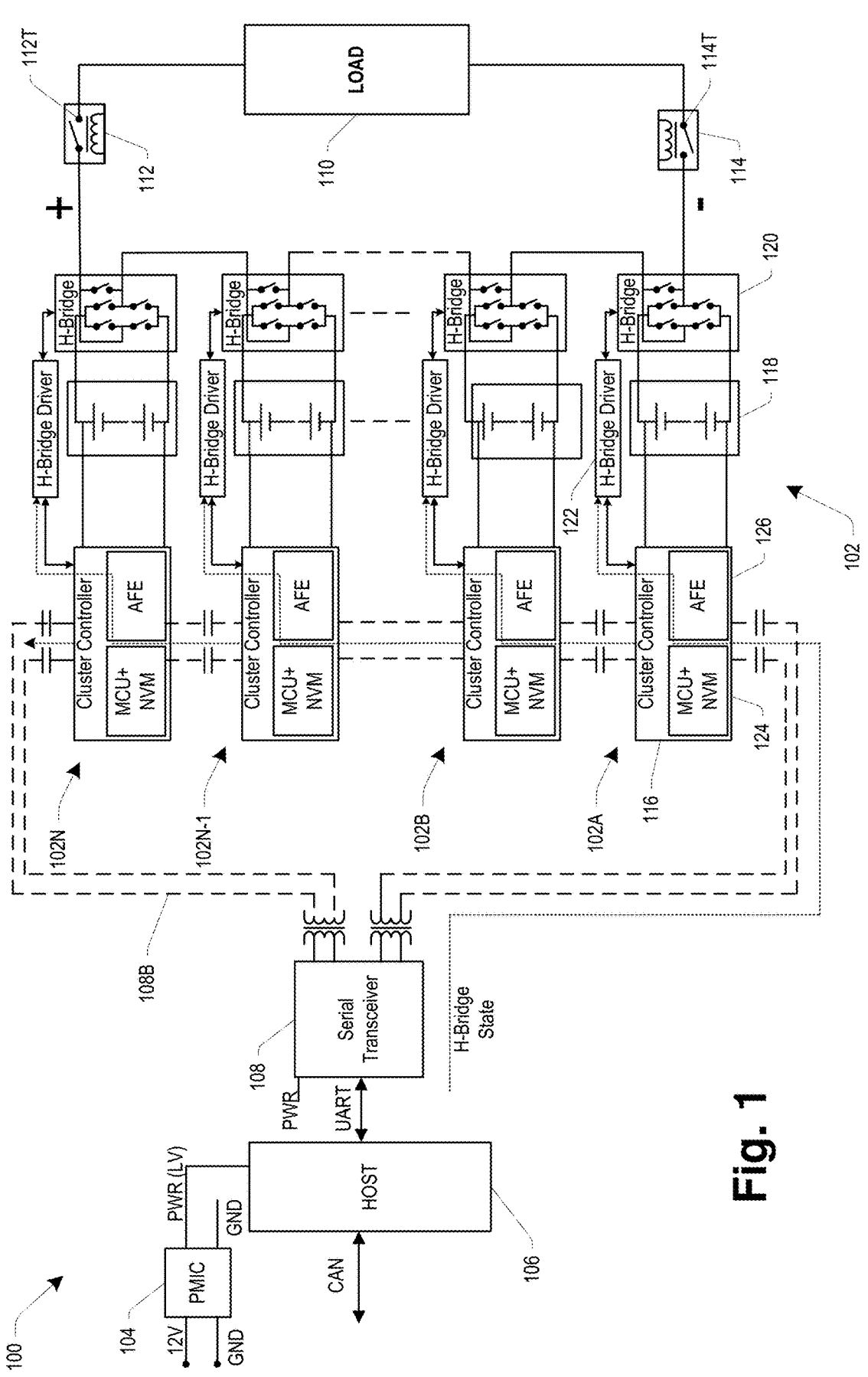
FIG. 1 is a schematic diagram of a battery system, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

FIG. 1 is a schematic diagram of a battery system 100, in accordance with some embodiments. In some embodiments, the battery system 100 comprises battery clusters 102, individually referred to as battery clusters 102A, 102B, 102N-1, 102N, a power management integrated circuit (PMIC) 104 connected to a supply voltage (e.g. 12 V) and a ground reference (e.g., chassis ground), a host processor 106 connected to the PMIC 104 to receive a low voltage (LV) power supply, and a serial transceiver 108 connected to between the host processor 106 and the battery clusters 102. The battery system 100 may be implemented in an electric vehicle, and the battery clusters 102 may provide power to a load 110, such as electric motors for moving the electric vehicle or other auxiliary loads in the electric vehicle. The battery system 100 is connected to the load 110 by a high side output relay 112 and a low side output relay 114 at output terminals 112T and 114T. The battery clusters 102 are subdivided and separately controlled elements of the main battery.

In some embodiments, each battery cluster 102 comprises a cluster controller 116, a battery element 118, an H-bridge 120 for selectively connecting the battery element 118 to the output relays 112 and 114, and an H-bridge driver 122 for controlling the state of the H-bridge 120. In some embodiments, the cluster controller 116 is implemented using Programmable System-on-a-Chip (PSoC®) hardware with programmable analog sub blocks that may be configured to control the battery clusters 102 based on direction from the host processor 106. The PSoC® may comprise cryptography hardware to provide security features. The cluster controller 116 may comprise a processing unit 124 including a microcontroller and non-volatile memory (or some other type of memory) and an analog front end 126. In some embodiments, the analog front end 126 provides an interface for sensing characteristics of the battery elements 118, such as temperature, voltage, or other parameters. In some embodiments, the host processor 106 employs a Controller Area Network (CAN) protocol for communication to an external domain controller and a Universal Asynchronous Receiver-Transmitter (UART) protocol for communicating with the serial transceiver 108. The serial transceiver 108 may implement an isolated UART protocol (ISO-UART) protocol to communicate with corresponding serial interfaces 302 (see FIG. 3) in the cluster controllers 116. In some embodiments, the cluster controller 116 sends messages to the H-bridge driver 122 using a Serial Peripheral Interface (SPI) or Inter-Integrated Circuit (I2C) protocol.

The H-bridge 120 comprises a set of switches that determine how the battery element 118 is connected to the output relays 112 and 114. In some embodiments, the state of the H-bridge 120 is controlled by the host processor 106 by sending a state message to the cluster controller 116. In some embodiments, the functionality for controlling the state of the H-bridge 120 is divided between the host processor 106 and the cluster controller 116. The H-bridge 120 may be configured by the H-bridge driver 122 to isolate the battery element 118 from the output relays 112 and 114, to connect the battery element 118 to the output relays 112 and 114 with a positive polarity, or to connect the battery element 118 to the output relays 112 and 114 with a negative polarity.

The number of battery clusters 102 may vary. The battery system 100 of FIG. 1 shows the arrangement for one phase of a three-phase system. Additional battery clusters 102 are provided for each phase (e.g., 16/phase*3 phases=48 battery clusters).

In some embodiments, the cluster controllers 116 are connected to a serial communication bus 108B implemented by the serial transceiver 108. The cluster controllers 116 are connected in a daisy chain arrangement, whereby a cluster controller 116 forwards a message to the next cluster controller 116 in the daisy chain until all cluster controllers 116 have received the message. In some embodiments, the serial communication bus 108B is configured in a ring topology where messages for the host processor 106 are forwarded to the cluster controller 116 of the last battery cluster 102N in the daisy chain and then to the serial transceiver 108. For example in a ring topology messages are sent in a counterclockwise direction from the cluster controller 116 of the battery cluster 102A to the cluster controller 116 of the battery cluster 102N. Messages originating from one of the cluster controllers 116 are sent in the same direction to the serial transceiver 108 for forwarding to the host processor 106.

In some embodiments, the serial communication bus 108B supports auto-addressing. During system initialization, the serial transceiver 108 identifies the cluster controllers 116 for the battery clusters 102 and assigns an address, such as a ring position, to each cluster controller 116. Initially, after power-up or interface timeout, each cluster controller 116 has an address of "0", The first bus address is assigned to the cluster controller 116 of the first battery cluster 102A responsive to receipt of a wake-up message from the serial transceiver 108. The cluster controller 116 of the first battery cluster 102A forwards the wake-up message to the cluster controller 116 of the second battery cluster 102B, resulting in an address being assigned to the cluster controller 116 of the second battery cluster 102B. The message forwarding and address assigning continues until all of the cluster controllers 116 of the battery clusters 102 have been assigned addresses. The serial transceiver 108 may communicate the configuration of the serial communication bus 108B and the attached cluster controllers 116 to the host processor 106.

On the serial communication bus 108B, the serial transceiver 108 provides isolation between the host processor 106 and the battery clusters 102, which are in different voltage domains. If the host processor 106 were to communicate in parallel with the cluster controllers 116 of the battery clusters 102, each connection between the host processor 106 and a cluster controller 116 would require 16 isolation circuits times 3 phases for a total of 48 isolation circuits. In addition, parallel addressing does not support auto addressing, requiring production programming to address the battery clusters 102. The use of the serial topology reduces bill of material costs, reduces footprint, and decreases programming complexity.

The battery clusters 102 may be controlled to generate a time varying waveform at the output terminals 112T or 114T for powering the load 110. For example, the states of the H-bridges 120 for the battery clusters 102 may be controlled to generate an AC waveform, such as a sinusoidal signal, at the output terminals 112T or 114T. Controlling the battery clusters 102 in this manner avoids the need to provide a separate inverter between the battery system 100 and the load 110 to generate the AC waveform.

In some embodiments, the processing overhead for generating the waveform is shared by the host processor 106 and the cluster controllers 116. The host processor 106 communicates waveform parameters to the cluster controllers 116, such as rank, frequency (Fsine), cluster voltage (Vcluster), and amplitude (Vmax), and signals the start of the waveform generation. Based on the waveform parameters, each cluster controller 116 calculates the switching times for its associated battery cluster 102 to control the H-bridge driver 122 to configure the H-bridge 120 to contribute to the waveform. However, since each cluster controller 116 independently controls the switching for the battery cluster 102, the clocks for the cluster controllers 116 should be synchronized. The host processor 106 controls a clock synchronization process to align the clocks of the cluster controllers 116.

Figure 2:
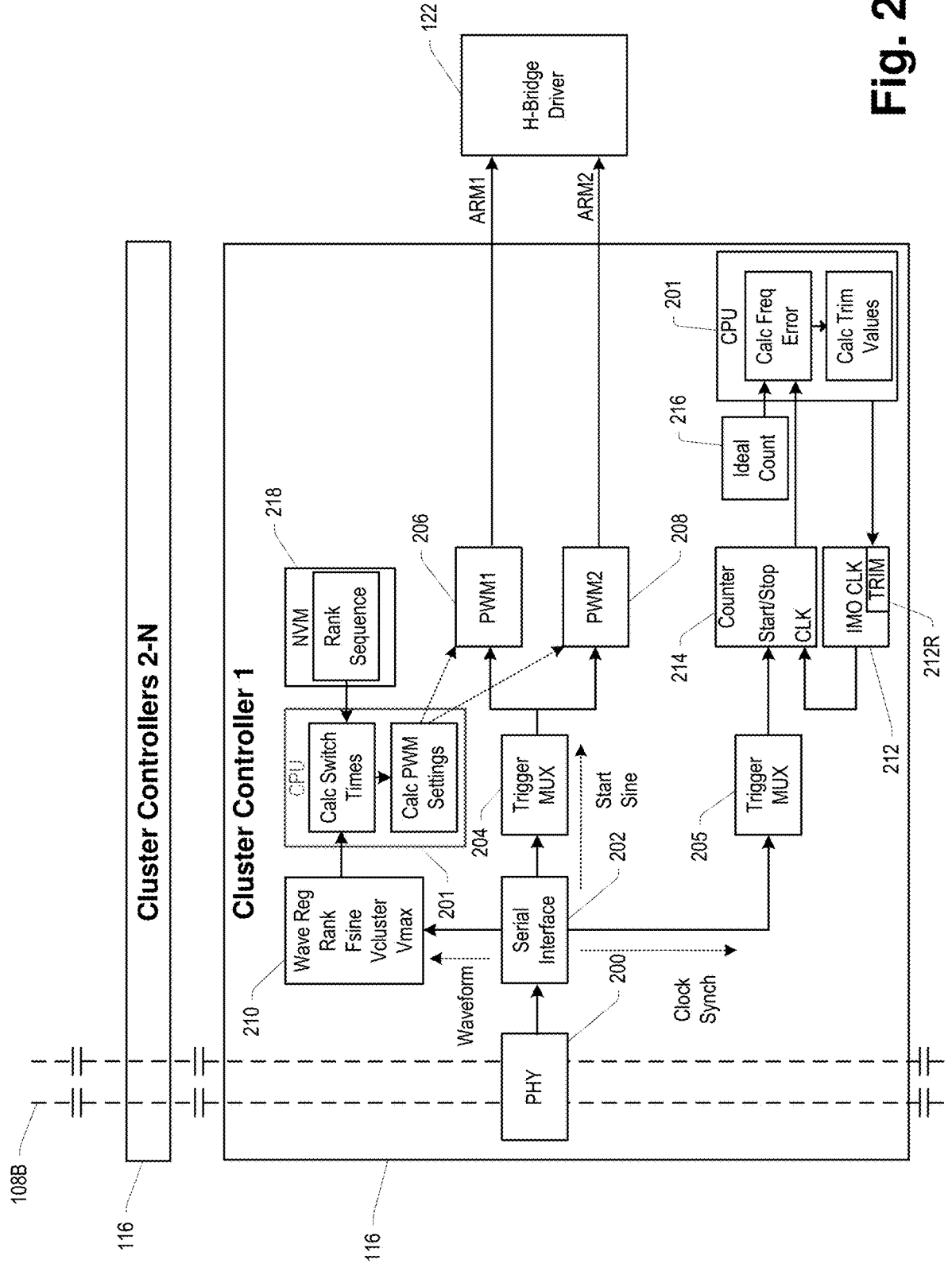
FIG. 2 is a schematic diagram of a cluster controller in a battery system, in accordance with some embodiments.

FIG. 2 is a schematic diagram of a cluster controller 116 in the battery system 100, in accordance with some embodiments. In some embodiments, each cluster controller 116 comprises a physical layer (PHY) 200 for implementing signaling in the serial protocol (e.g., ISO-UART), a CPU

201, a serial interface 202 for extracting data per the serial protocol, trigger multiplexers (MUX) 204 and 205, and pulse width modulation (PWM) units 206 and 208 configured to generate bridge configuration signals, ARM1 and ARM2, for controlling the H-bridge driver 122 to set the state of the H-bridge 120. In some embodiments, asserting the ARM1 while de-asserting the ARM2 signal controls the H-bridge driver 122 to connect the battery element 118 with positive polarity and asserting the ARM2 while de-asserting the ARM2 signal controls the H-bridge driver 122 to connect the battery element 118 with negative polarity. De-asserting both ARM1 and ARM2 disconnects the battery element 118. The trigger multiplexers 204 and 205 are part of a large group of programmable multiplexers that allow routing of trigger signals from any source to a destination peripheral.

The cluster controller 116 implements clock synchronization using an internal mail oscillator (IMO) clock 212 and a counter 214. The IMO clock 212 has a trim register 212R for storing a configurable trim parameter that trims, e.g., in the positive or negative direction, the transitions of the IMO clock 212 to achieve synchronization. In one example, the frequency of the IMO clock 212 is 48 MHz with a trim step size of 15 kHz, resulting in a trim accuracy of 0.03%. To facilitate synchronization, the host processor 106 sends a synchronization signal comprising a start signal and a stop signal. The predetermined time interval between the start signal and the stop signal is converted to an ideal count value based on the frequency of the IMO clock 212 and is communicated by the host processor 106 to the cluster controller 116 and stored in a register 216. Responsive to receiving the start signal from the host processor 106, the cluster controller starts the counter 214. The cluster controller 116 stops the counter 214 responsive to receiving the stop signal from the host processor 106. The CPU 201 calculates the difference between the actual count recorded in the counter 214 between the start signal and the stop signal and the ideal count value in the register 216. The frequency error is represented by:

$$Freq\ Error = \left(\frac{Actual\ Count}{Ideal\ Count} - 1\right) \cdot Ideal\ IMO\ Freq.$$

The CPU 201 sets the trim parameter in the trim register 212R to minimize the frequency error. The time interval between synchronization signals depends on the trim accuracy of the IMO clock 212, the frequency of the IMO clock 212, and the maximum allowed latency:

$$Min\ Sync\ Time = \frac{Fimo}{Fimo\ trim} \cdot Max\ Latency.$$

For the given example, the minimum sync time for a maximum latency of 500 ns is 1600 us. A slower IMO clock frequency or a larger clock sync error results in the sync signal needing to be sent more often. Since the predetermined time interval and resulting ideal count value are known, the determination of the frequency error is independent of the latency associated with the communication between the host processor 106 and the cluster controller 116 based on its position on the serial communication bus 108B. Both the start and the stop signal experience the same propagation delay through the serial communication, so differentially this propagation delay cancels out and does not affect the measurement.

In some embodiments, the cluster controller 116 stores the waveform parameters (rank, Fsine, Vcluster, Vmax) sent by the host processor 106 in a waveform register 210. The CPU 201 calculates switch times and PWM settings based on the waveform parameters and configures the PWMs 206 and 208. Although two CPUs 201 are shown in FIG. 1 to illustrate the calculations performed for synchronization and the calculations performed for switching, the calculations can be performed by the same physical processing unit or more than two processing units.

Figure 3:
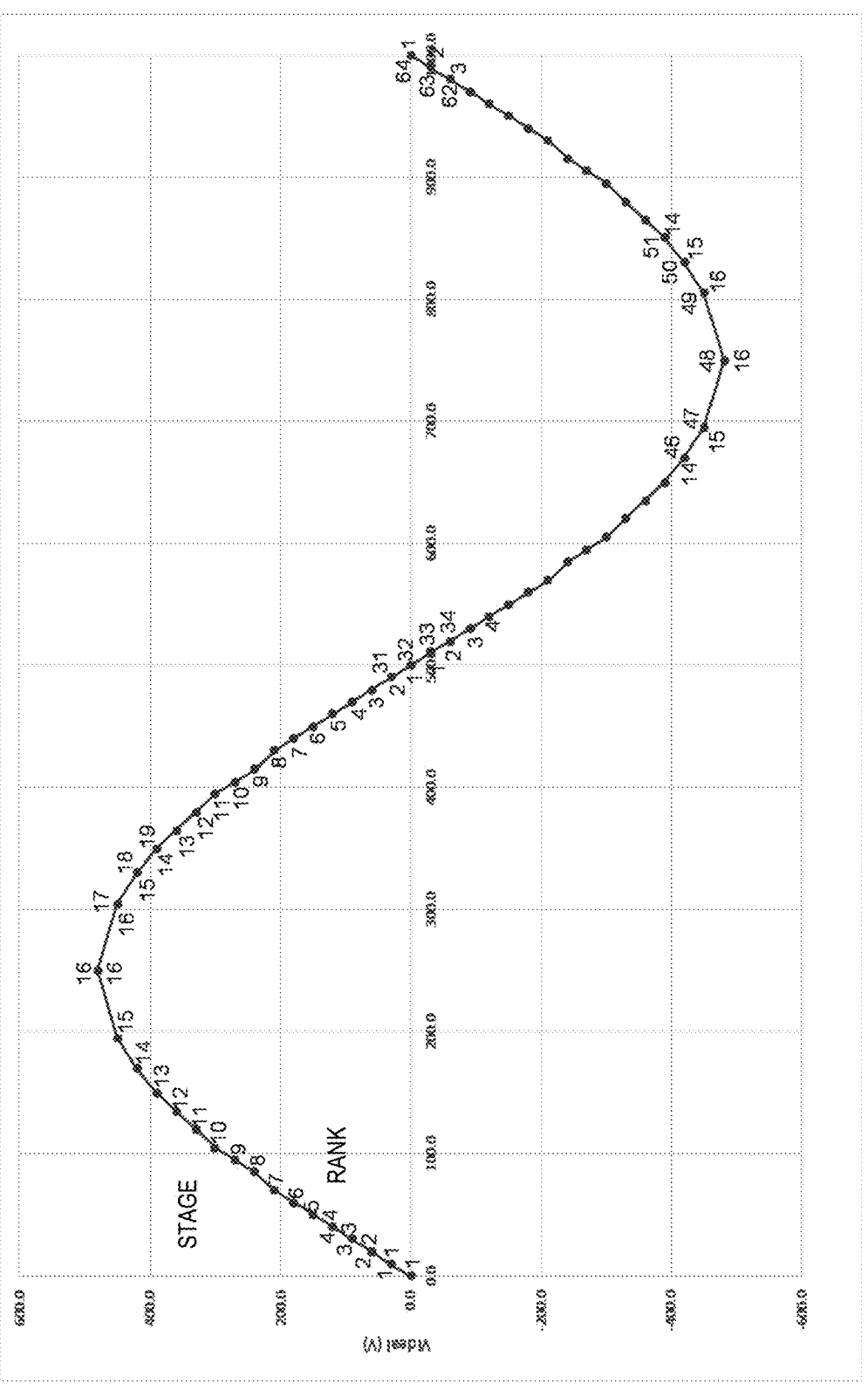
FIG. 3 is a waveform diagram illustrating an output waveform generated by a battery system, in accordance with some embodiments.

FIG. 3 is a waveform diagram illustrating an output waveform 300 generated by the battery system 100, in accordance with some embodiments. In some embodiments, the output waveform 300 may be an approximation of a sinusoidal signal. In an example with 16 battery clusters 102, the cluster voltage, Vcluster, is 30V and the maximum voltage, Vmax, is 480V. Each battery cluster 102 switches in or out one time for each ¼ period of the waveform for 64 total transitions. The numbers above the output waveform 300 represent the stage number of the switching scheme (e.g. 64 stages for one cycle of the output waveform 300 and the numbers below the output waveform 300 represent the rank of the battery cluster 102 switching at the current time interval.

In some embodiments, the rank does not correspond to the device number or the position of a cluster controller 116 on the serial communication bus 108B. For example, the battery clusters 102 may not switch sequentially. The rank represents the relative position of the cluster controller 116 in the switching scheme for generating the output waveform 300. The host processor 106 may assign initial ranks based on load balancing for the battery clusters 102. After assignment of the initial ranks, each cluster controller 116 may follow a predetermined rank sequence sored in a portion of non-volatile memory 218 of the cluster controller 116. Thus, the rank may change over time to provide load balancing, since each rank does not stay switched in or switched out for the same time interval. The host processor may change the initial rank and restart the rank sequence to address second or third order balancing issues.

To generate the output waveform 300, each cluster controller 116 calculates its switching behavior as a function of its assigned rank and configures the PWMs 206 and 208. As the ranks changes for load balancing based on an assignment from the host processor 106 or based on the rank sequence in the non-volatile memory 218, the cluster controller 116 updates the switching behavior. In the output waveform 300, switching occurs more frequently at the zero crossing regions. The minimum step time for switching for a system with NumCluster=16 and Fsine=1 kHz is:

$$tstepmin = \frac{1}{2\pi \cdot NumCluster \cdot Fsine} = \sim10 \text{ us.}$$

FIG. 4 is a diagram 400 illustrating switching behavior for the battery clusters 102 as a function of rank to generate the output waveform 300, in accordance with some embodiments. The diagram 400 includes switch position table 402, a voltage table 404, a switch time table 406, and a counter value table 408.

Each cluster has four switch positions per cycle of the output waveform 300. For a sine wave, the first half cycle is positive and the second half cycle is negative. Each battery cluster 102 switches four times—Ph1: switch on positive, Ph2: switch off, Ph3: switch on negative, and Ph4: switch off. The switching events are programmed into the PWM 206 to control the ARM1 signal and into the PWM 208 to control the ARM2 signal. The switch positions for a given battery cluster 102 are determined based on its assigned rank as shown in the switch position table 402:

$$Switch\ Positions = [Ph1: \text{Rank}, Ph2: ([NumClusters \cdot 2 + 1] - \text{Rank}),$$
$$Ph3: ([NumClusters \cdot 2] + \text{Rank}), Ph4: ([NumClusters \cdot 4 + 1] - \text{Rank})].$$

The voltage at each switch position is calculated based on the position and the voltage of each battery cluster 102, Vcluster, as shown in the voltage table 404:

$$Voltage\ at\ Switch\ Positions\ (Vsine) =$$
$$\begin{bmatrix} Ph1: Vcluster \cdot \text{Position,} \\ Ph2: Vcluster \cdot ([NumClusters \cdot 2] - \text{Position}), \\ Ph3: Vcluster \cdot ([NumClusters \cdot 2] - \text{Position}), \\ Ph4: Vcluster \cdot (\text{Position} - [NumClusters \cdot 4]) \end{bmatrix}$$

The switch time for each switch position is calculated based on the frequency, Fsine, Tsine=1/Fsine, the max sine voltage Vmax, and the voltage, Vsine, at the particular switch position as shown in the switch time table 406:

$$Switch\ Times\ (Tswitch) = \begin{bmatrix} Ph1: \dfrac{\sin^{-1}\left(\dfrac{Vsine}{Vmax}\right)}{2\pi \cdot Fsine}, \\ Ph2: \dfrac{Tsine}{2} - \dfrac{\sin^{-1}\left(\dfrac{Vsine}{Vmax}\right)}{2\pi.Fsine}, \\ Ph3: \dfrac{Tsine}{2} - \dfrac{\sin^{-1}\left(\dfrac{Vsine}{Vmax}\right)}{2\pi.Fsine}, \\ Ph4: Tsine + \dfrac{\sin^{-1}\left(\dfrac{Vsine}{Vmax}\right)}{2\pi \cdot Fsine} \end{bmatrix}.$$

The PWM units 206 and 208 use counters to control transition times. Counter values for a cycle of the output waveform 300 could range from 0 to 200 as shown in the table 408 as one example, where each counter step has a length of 5 us for a 1 kHz sine wave. The counter value at each switch position can be calculated based on the time, Tswitch, and the counter time step, Tcounter step (e.g., 5 us) as shown in the table 408:

$$Counter\ at\ Switch\ Positions = ROUND\left(\frac{Tswitch}{Tcounter\ step}\right)$$

The host processor 106 sends the waveform parameters (rank, Fsine, Vcluster, Vmax) for the output waveform 300 to the cluster controllers 116. The cluster controller 116 stores the waveform parameters in the waveform register 210. The CPU 201 calculates the switch times and PWM settings and configures the switching behavior in the PWMs 206, 208. The host processor 106 sends a start waveform signal to the cluster controllers 116. The switching behavior of the battery clusters 102 is synchronized based on the trim parameters in the IMO clocks 212.

FIG. 5 is a flow diagram of a method 500 for generating an output waveform 300 in a battery system 100, in accordance with some embodiments. At 502, a first cluster controller 116 of a first battery cluster 102 is connected to a serial communication bus 108B. At 504, a second cluster controller 116 of a second battery cluster 102 is connected to the serial communication bus 108B. At 506, waveform data and a first rank are received in the first cluster controller 116 from the serial communication bus 108B. At 508, the waveform data and a second rank are received in the second cluster controller 116 from the serial communication bus 108B. At 510, a waveform start signal is received in the first cluster controller 116 and the second cluster controller 116 from the serial communication bus 108B. In some embodiments, a start/stop synchronization signal may be sent prior to the waveform start signal. At 512, responsive to receiving the waveform start signal, a first bridge 120 in the first battery cluster 102 is controlled in the first cluster controller 116 to connect a first battery terminal of the first battery cluster 102 to an output terminal 112T or 114T based on the waveform data and the first rank to generate a first component of an output waveform 300. At 514, responsive to receiving the waveform start signal a second bridge 120 of the second battery cluster 102 is controlled in the second cluster controller 116 to connect a second battery terminal of the second battery cluster 102 to the output terminal 112T or 114T based on the waveform data and the second rank to generate a second component of the output waveform 300.

Figure 6:
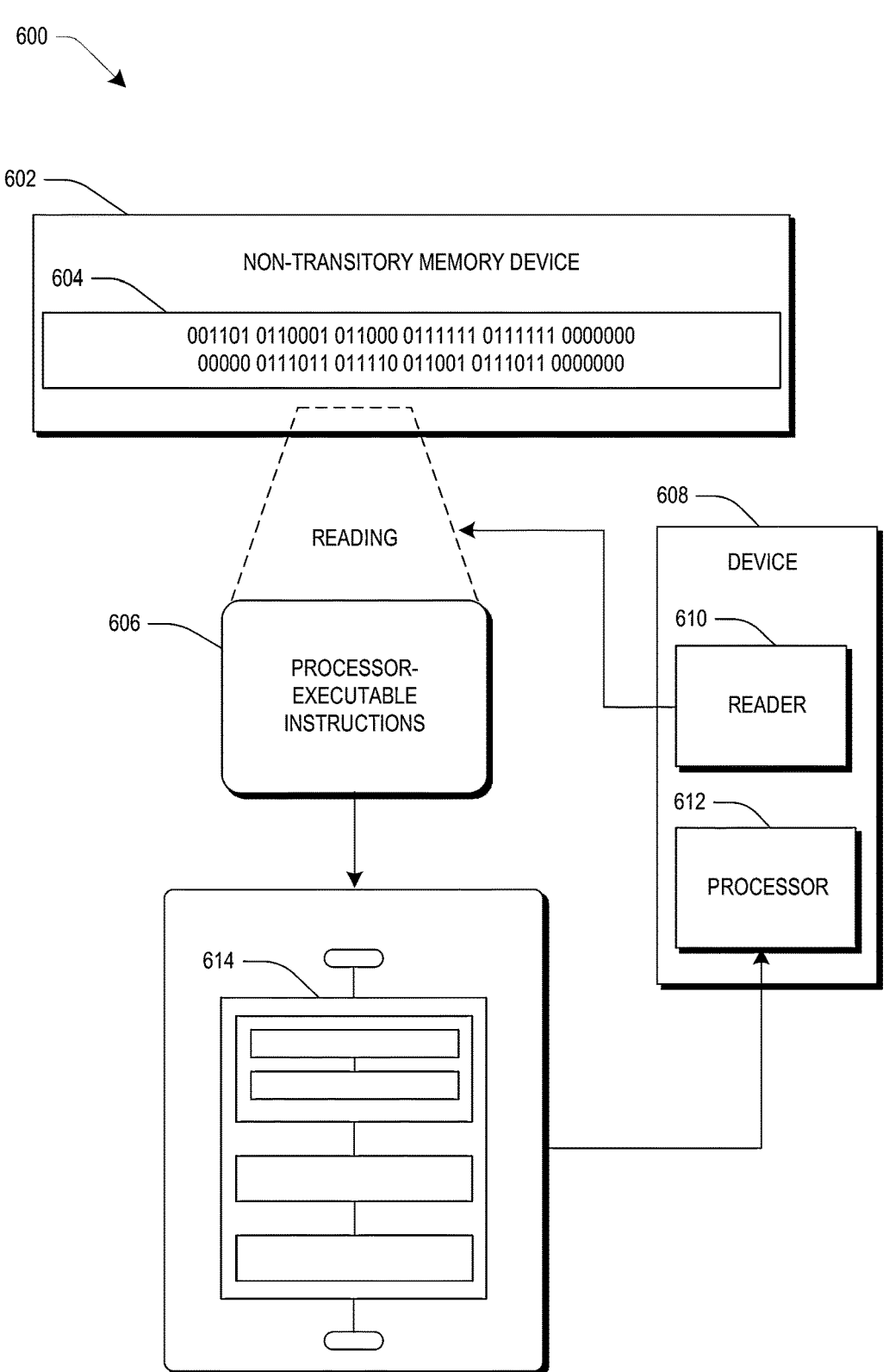
FIG. 6 illustrates an exemplary embodiment of a computer-readable medium, in accordance with some embodiments.

FIG. 6 illustrates an exemplary embodiment 600 of a computer-readable medium 602, in accordance with some embodiments. One or more embodiments involve a computer-readable medium comprising processor-executable instructions configured to implement one or more of the techniques presented herein. The embodiment 600 comprises a non-transitory computer-readable medium 602 (e.g., a CD-R, DVD-R, flash drive, a platter of a hard disk drive, etc.), on which is encoded computer-readable data 604. This computer-readable data 604 in turn comprises a set of processor-executable computer instructions 606 that, when executed by a computing device 608 including a reader 610 for reading the processor-executable computer instructions 606 and a processor 612 for executing the processor-executable computer instructions 606, are configured to facilitate operations according to one or more of the principles set forth herein. In some embodiments, the processor-executable computer instructions 606, when executed, are configured to facilitate performance of a method 614, such as at least some of the aforementioned method(s). In some embodiments, the processor-executable computer instructions 606, when executed, are configured to facilitate implementation of a system, such as at least some of the aforementioned system(s). Many such computer-readable media may be devised by those of ordinary skill in the art that are configured to operate in accordance with the techniques presented herein.

Controlling the battery clusters 102 by determining the switching parameters in the cluster controller 116 based on the assigned rank and waveform data reduces traffic on the serial communication bus 108S and reduces processing load on the host processor 106. This approach reduces hardware cost, reduces isolated communication power consumption due to reduced traffic, and provides programming flexibility for adding future features.

According to some embodiments, a method comprises connecting a first cluster controller of a first battery cluster to a serial communication bus, connecting a second cluster controller of a second battery cluster to the serial communication bus, receiving waveform data and a first rank in the first cluster controller from the serial communication bus, receiving the waveform data and a second rank in the second cluster controller from the serial communication bus, receiving a waveform start signal in the first cluster controller and the second cluster controller from the serial communication bus, and responsive to receiving the waveform start signal, controlling, in the first cluster controller, a first bridge of the first battery cluster to connect a first battery terminal of the first battery cluster to an output terminal based on the waveform data and the first rank to generate a first component of a waveform, and controlling, in the second cluster controller, a second bridge of the second battery cluster to connect a second battery terminal of the second battery cluster to the output terminal based on the waveform data and the second rank to generate a second component of the waveform.

According to some embodiments, the method comprises receiving a synchronization message in the first cluster controller, and adjusting a trim parameter of a clock unit for generating a clock signal based on the trim parameter in the first cluster controller based on the synchronization message, wherein controlling, in the first cluster controller, the first bridge of the first battery cluster comprises controlling the first bridge based on the clock signal after adjusting the trim parameter.

According to some embodiments, receiving the synchronization message comprises receiving a start message, and receiving a stop message, adjusting the trim parameter of the clock unit comprises starting a counter connected to receive the clock signal responsive to receiving the start message, stopping the counter responsive to receiving the stop message to generate a measured count, determining a frequency error based on the measured count and an ideal count for the synchronization message, and adjusting the trim parameter based on the frequency error.

According to some embodiments, controlling, in the first cluster controller, the first bridge of the first battery cluster comprises generating a switching parameter based on the first rank and the waveform data, and configuring a modulation unit configured to control the first bridge based on the switching parameter.

According to some embodiments, generating the switching parameter comprises determining a switch position for the first bridge based on the first rank, determining a waveform voltage based on the switch position and a cluster voltage of the first battery cluster, and determining a switch time for the switch position based on the waveform voltage and the waveform data, and the switching parameter comprises the switch time.

According to some embodiments, generating the switching parameter comprises determining a count value based on the switch time, and the switching parameter comprises the count value.

According to some embodiments, connecting the first cluster controller to the serial communication bus comprises connecting the second cluster controller to the serial communication bus by connecting the first cluster controller and the second cluster controller to the serial communication bus in a ring topology.

According to some embodiments, connecting the first cluster controller to the serial communication bus comprises automatically assigning an address to the first cluster controller according to a protocol of the serial communication bus.

According to some embodiments, the method comprises changing the first rank in the first cluster controller according to a rank sequence to generate a modified first rank, controlling, in the first cluster controller, the first bridge based on the modified first rank, changing the second rank in the second cluster controller according to the rank sequence to generate a modified second rank, and controlling, in the second cluster controller, the second bridge based on the modified second rank.

According to some embodiments, a battery cluster controller comprises a serial interface configured to receive waveform data and a rank over a serial communication bus, a processor configured to generate a switching parameter based on the rank and the waveform data, and a modulation unit configured with the switching parameter to generate a bridge configuration signal to control a bridge for selectively connecting a battery element to an output terminal to generate a first component of a waveform.

According to some embodiments, the battery cluster controller comprises a clock unit connected to the modulation unit and configured to generate a clock signal based on a trim parameter, wherein the processor is configured to receive a synchronization message, and adjust the trim parameter based on the synchronization message.

According to some embodiments, the battery cluster controller comprises a counter connected to the clock unit, wherein the synchronization message comprises a start message and a stop message, and the processor is configured to start the counter responsive to receiving the start message, stop the counter responsive to receiving the stop message to generate a measured count, determine a frequency error based on the measured count and an ideal count for the synchronization message, and adjust the trim parameter based on the frequency error.

According to some embodiments, the processor is configured to generate the switch parameter by determining a switch position for the bridge based on the rank, determining a waveform voltage based on the switch position and a cluster voltage of the battery cluster, determining a switch time for the switch position based on the waveform voltage and the waveform data, and configuring the switching parameter based on the switch time.

According to some embodiments, the processor is configured to generate the switch parameter by determining a count value based on the switch time, and configuring the switching parameter based on the count value.

According to some embodiments, the serial interface is configured to receive an address automatically assigned to the battery cluster controller according to a protocol of the serial communication bus.

According to some embodiments, the processor is configured to modify the rank according to a rank sequence to generate a modified rank, and update the switching parameter in the modulation unit based on the modified rank.

According to some embodiments, a system comprises an output terminal, a serial communication bus, a first battery cluster comprising a first battery element, a first bridge configured to selectively connect the first battery element to the output terminal based on a state of the first bridge, and a first cluster controller connected to first bridge and the serial communication bus and configured to receive waveform data and a first rank from the serial communication bus, receive a waveform start signal from the serial communication bus, and control the first bridge to connect the first battery element to the output terminal based on the waveform data and the first rank to generate a first component of a waveform, and a second battery cluster comprises a second battery element, a second bridge configured to selectively connect the second battery element to the output terminal based on a state of the second bridge, and a second cluster controller connected to the second bridge and the serial communication bus and configured to receive the waveform data and a second rank from the serial communication bus, receive the waveform start signal from the serial communication bus, and control the second bridge to connect the second battery element to the output terminal based on the waveform data and the second rank to generate a second component of the waveform.

According to some embodiments, the first cluster controller comprises a clock unit configured to generate a clock signal based on a trim parameter, a processor configured to generate a switching parameter based on the rank and the waveform data, a modulation unit configured with the switching parameter to generate a bridge configuration signal to control the first bridge based on the clock signal, and the processor is configured to receive a synchronization message, and adjust the trim parameter based on the synchronization message.

According to some embodiments, the first cluster controller comprises a counter connected to the clock unit, the synchronization message comprises a start message and a stop message, and the processor is configured to start the counter responsive to receiving the start message, stop the counter responsive to receiving the stop message to generate a measured count, determine a frequency error based on the measured count and an ideal count for the synchronization message, and adjust the trim parameter based on the frequency error.

According to some embodiments, the first cluster controller comprises a processor configured to generate a switching parameter based on the rank and the waveform data, and a modulation unit configured with the switching parameter to generate a bridge configuration signal to control the first bridge, and the processor is configured to generate the switching parameter by determining a switch position for the first bridge based on the first rank, determining a waveform voltage based on the switch position and a cluster voltage of the first battery cluster, determining a switch time for the switch position based on the waveform voltage and the waveform data, and configuring the switching parameter based on the switch time.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing at least some of the claims.

As used in this application, "or" is intended to mean an inclusive "or" rather than an exclusive "or". In addition, "a" and "an" as used in this application and the appended claims are generally to be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A method, comprising:
connecting a first cluster controller of a first battery cluster to a serial communication bus;
connecting a second cluster controller of a second battery cluster to the serial communication bus;
receiving waveform data and a first rank in the first cluster controller from the serial communication bus;
receiving the waveform data and a second rank in the second cluster controller from the serial communication bus;
receiving a waveform start signal in the first cluster controller and the second cluster controller from the serial communication bus; and
responsive to receiving the waveform start signal:
controlling, in the first cluster controller, a first bridge of the first battery cluster to connect a first battery terminal of the first battery cluster to an output terminal based on the waveform data and the first rank to generate a first component of a waveform; and
controlling, in the second cluster controller, a second bridge of the second battery cluster to connect a second battery terminal of the second battery cluster to the output terminal based on the waveform data and the second rank to generate a second component of the waveform.

2. The method of claim 1, comprising:
receiving a synchronization message in the first cluster controller; and
adjusting a trim parameter of a clock unit for generating a clock signal based on the trim parameter in the first cluster controller based on the synchronization message, wherein:
controlling, in the first cluster controller, the first bridge of the first battery cluster comprises controlling the first bridge based on the clock signal after adjusting the trim parameter.

3. The method of claim 1, wherein:
controlling, in the first cluster controller, the first bridge of the first battery cluster comprises:
generating a switching parameter based on the first rank and the waveform data; and
configuring a modulation unit configured to control the first bridge based on the switching parameter.

4. The method of claim 1, wherein connecting the first cluster controller to the serial communication bus comprises and connecting the second cluster controller to the serial communication bus comprises:
connecting the first cluster controller and the second cluster controller to the serial communication bus in a ring topology.

5. The method of claim 1, wherein connecting the first cluster controller to the serial communication bus comprises:
automatically assigning an address to the first cluster controller according to a protocol of the serial communication bus.

6. The method of claim 1, comprising:
changing the first rank in the first cluster controller according to a rank sequence to generate a modified first rank;
controlling, in the first cluster controller, the first bridge based on the modified first rank;
changing the second rank in the second cluster controller according to the rank sequence to generate a modified second rank; and;
controlling, in the second cluster controller, the second bridge based on the modified second rank.

7. The method of claim 2, wherein:
receiving the synchronization message comprises:
receiving a start message; and
receiving a stop message;
adjusting the trim parameter of the clock unit comprises:
starting a counter connected to receive the clock signal responsive to receiving the start message;
stopping the counter responsive to receiving the stop message to generate a measured count;
determining a frequency error based on the measured count and an ideal count for the synchronization message; and
adjusting the trim parameter based on the frequency error.

8. The method of claim 3, wherein:

generating the switching parameter comprises:

determining a switch position for the first bridge based on the first rank;

determining a waveform voltage based on the switch position and a cluster voltage of the first battery cluster; and determining a switch time for the switch position based on the waveform voltage and the waveform data; and the switching parameter comprises the switch time.

9. The method of claim 8, wherein:

generating the switching parameter comprises determining a count value based on the switch time; and the switching parameter comprises the count value.

10. A battery cluster controller, comprising:

a serial interface configured to receive waveform data and a rank over a serial communication bus;

a processor configured to generate a switching parameter based on the rank and the waveform data;

a modulation unit configured with the switching parameter to generate a bridge configuration signal to control a bridge for selectively connecting a battery element to an output terminal to generate a first component of a waveform;

a clock unit connected to the modulation unit and configured to generate a clock signal based on a trim parameter; and a counter connected to the clock unit; wherein:

the processor is configured to:

receive a synchronization message, wherein the synchronization message comprises a start message and a stop message and adjust the trim parameter based on the synchronization message, start the counter responsive to receiving the start message, stop the counter responsive to receiving the stop message to generate a measured count, determine a frequency error based on the measured count and an ideal count for the synchronization message, and adjust the trim parameter based on the frequency error.

11. The battery cluster controller of claim 10, wherein the processor is configured to generate the switch parameter by:

determining a switch position for the bridge based on the rank;

determining a waveform voltage based on the switch position and a cluster voltage of the battery cluster;

determining a switch time for the switch position based on the waveform voltage and the waveform data; and configuring the switching parameter based on the switch time.

12. The battery cluster controller of claim 10, wherein:

the serial interface is configured to receive an address automatically assigned to the battery cluster controller according to a protocol of the serial communication bus.

13. The battery cluster controller of claim 10, wherein:

the processor is configured to:

modify the rank according to a rank sequence to generate a modified rank; and update the switching parameter in the modulation unit based on the modified rank.

14. The battery cluster controller of claim 11, wherein the processor is configured to generate the switch parameter by:

determining a count value based on the switch time; and configuring the switching parameter based on the count value.

15. A system, comprising:

an output terminal;

a serial communication bus;

a first battery cluster comprising:

a first battery element;

a first bridge configured to selectively connect the first battery element to the output terminal based on a state of the first bridge; and a first cluster controller connected to first bridge and the serial communication bus and configured to:

receive waveform data and a first rank from the serial communication bus;

receive a waveform start signal from the serial communication bus; and control the first bridge to connect the first battery element to the output terminal based on the waveform data and the first rank to generate a first component of a waveform; and a second battery cluster comprising:

a second battery element;

a second bridge configured to selectively connect the second battery element to the output terminal based on a state of the second bridge; and a second cluster controller connected to the second bridge and the serial communication bus and configured to:

receive the waveform data and a second rank from the serial communication bus;

receive the waveform start signal from the serial communication bus; and control the second bridge to connect the second battery element to the output terminal based on the waveform data and the second rank to generate a second component of the waveform.

16. The system of claim 15, wherein:

the first cluster controller comprises:

a clock unit configured to generate a clock signal based on a trim parameter;

a processor configured to generate a switching parameter based on the rank and the waveform data;

a modulation unit configured with the switching parameter to generate a bridge configuration signal to control the first bridge based on the clock signal; and the processor is configured to:

receive a synchronization message; and adjust the trim parameter based on the synchronization message.

17. The system of claim 15, wherein:

the first cluster controller comprises:

a processor configured to generate a switching parameter based on the rank and the waveform data; and a modulation unit configured with the switching parameter to generate a bridge configuration signal to control the first bridge; and the processor is configured to generate the switching parameter by:

determining a switch position for the first bridge based on the first rank;

determining a waveform voltage based on the switch position and a cluster voltage of the first battery cluster;

determining a switch time for the switch position based on the waveform voltage and the waveform data; and configuring the switching parameter based on the switch time.

18. The system of claim 16, wherein:

the first cluster controller comprises a counter connected to the clock unit;

the synchronization message comprises a start message and a stop message; and the processor is configured to:

start the counter responsive to receiving the start message;

stop the counter responsive to receiving the stop message to generate a measured count;

determine a frequency error based on the measured count and an ideal count for the synchronization message; and adjust the trim parameter based on the frequency error.

\* \* \* \* \*